United States Patent

Dutschke

[15] 3,648,870

[45] Mar. 14, 1972

[54] HARVESTER

[72] Inventor: Thomas W. Dutschke, 1709 58th Ave. Drive, W., Bradenton, Fla. 33505

[22] Filed: Apr. 24, 1970

[21] Appl. No.: 31,593

[52] U.S. Cl. .............................214/519, 214/83.1, 198/153
[51] Int. Cl. .....................................B60p 1/38, A01d 45/00
[58] Field of Search.....................214/519, 521, 522, 83, 26, 214/83.1; 198/153

[56] References Cited

UNITED STATES PATENTS

| | | | |
|---|---|---|---|
| 2,788,141 | 4/1957 | Hendrix | 214/83.1 |
| 751,676 | 2/1904 | Nelson | 198/153 X |
| 1,422,656 | 7/1922 | Brennan | 198/153 X |
| 3,147,846 | 9/1964 | Hunntoon | 198/153 X |

FOREIGN PATENTS OR APPLICATIONS 1,277,650   10/1961   France....................198/153

*Primary Examiner*—Albert J. Makay
*Attorney*—Stefan M. Stein

[57] ABSTRACT

A harvesting machine which has a number of conveyors and seats for pickers. The endless conveyors are formed from a pair of endless chains which are held in a parallel, fixed relation by a plurality of transverse, perpendicular, planar ladders. Attached to the top of the ladders is a flexible apron which overlaps the adjacent ladder and forms a pouch to carry the fruit without damage. This structure also allows for the fruit to be gently lowered onto an unloading surface without damage.

10 Claims, 6 Drawing Figures

PATENTED MAR 14 1972  3,648,870

INVENTOR.
THOMAS W. DUTSCHKE
BY
*Stefan M. Stein*
ATTORNEY.

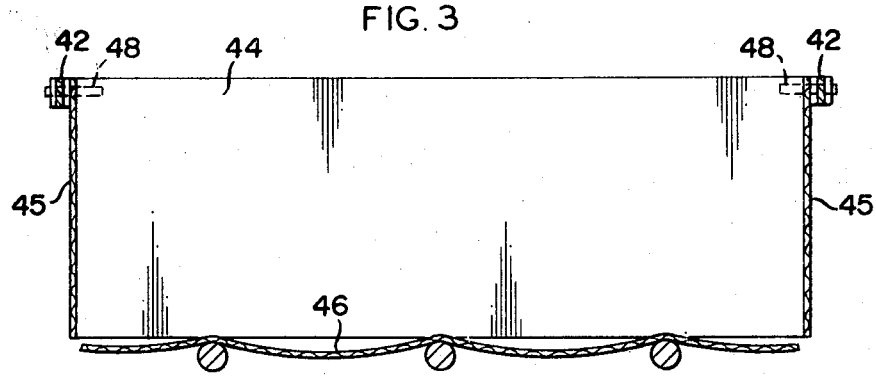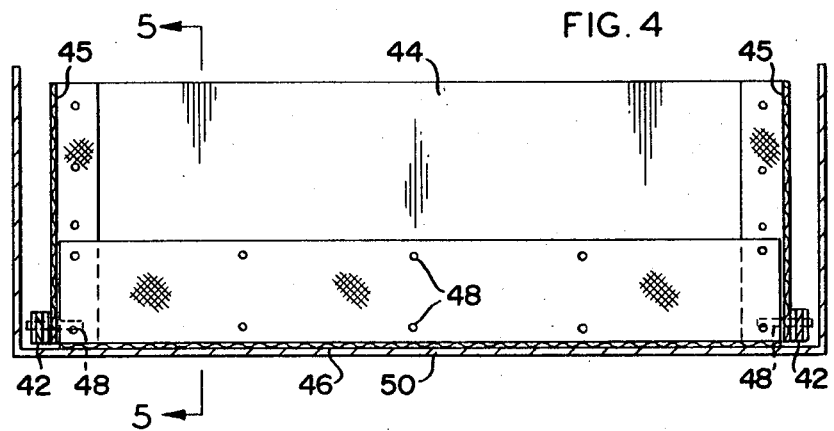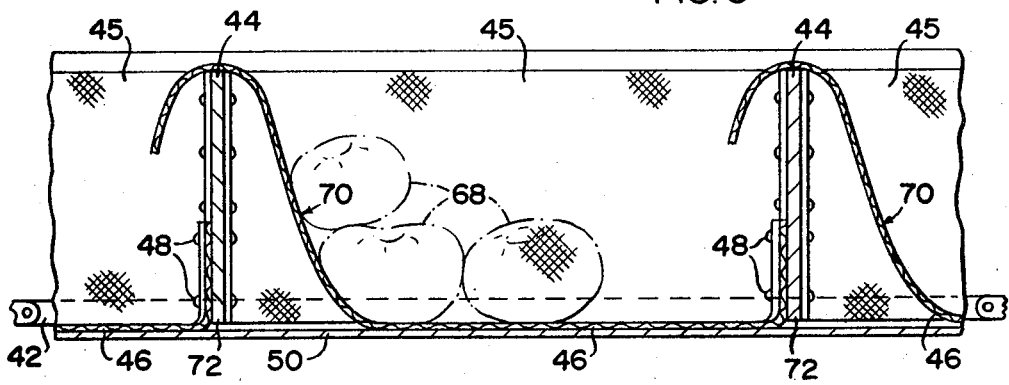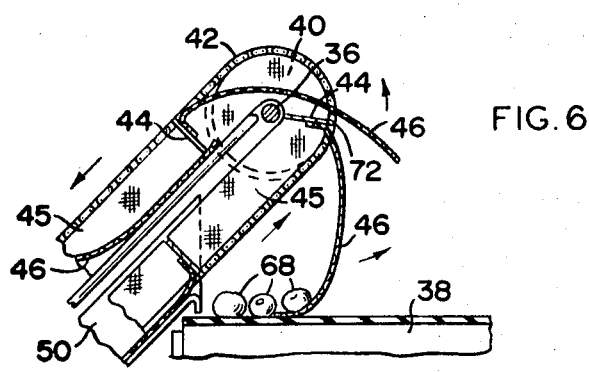

HARVESTER

This invention relates generally to harvesting fruits and vegetables and in particular to a conveyor system that allows these comestibles to be gently handled.

The cost of harvesting fruit and vegetables, such as tomatoes, has risen drastically in the last few years. One of the substantial factors in this rise has been the high cost of farm labor. In an attempt to lower these costs much effort has been made to develop mechanized harvesters and pickers. With some types of crops, these harvesters have been successful in lowering costs. The harvesting of tomatoes is one type of crop in which it is very difficult to mechanically pick.

The major problem with tomatoes is their uneven ripening rate. It is not uncommon for a tomato field to have two or more pickings during a season. This requires the grower to assemble a relatively large labor force which is utilized for a short period of time. Because of the difficulties in this type of hand harvesting, it is not uncommon for a grower to realize only about half of the potential yield of his fields, considering all the rejection losses.

Some mechanized tomato harvesters have been developed. Some examples of the various prior art devices for harvesting tomatoes are illustrated by the following U.S. Pats. Nos. 3,199,604, 3,390,768, 3,436,902, and 3,437,151. These devices all utilize the concept of severing the tomato plant at or below the surface. The vine is mechanically taken up and the tomatoes are shaken off. The leaves, dirt and other matter is then removed and the tomatoes are then loaded into bins. Under certain circumstances a machine of this type may be satisfactory. That is, if the grower is operating a series of huge fields and it is economically sound only to have a 20–30 percent yield. However, with respect to the smaller grower, a machine which destroys his tomato vines after only one picking would mean economic ruin.

This smaller grower needs a compromise between hand picking and a fully automated system. Also, since the smaller grower's yield percentage is critical, he needs a machine which will lower his losses from bruising and breaking to an absolute minimum and at the same time enable him to harvest his fields several times during the season.

It is therefore an object of this invention to provide a machine for harvesting tomatoes and other fragile fruits and vegetables.

Another object is to provide a harvester which carries the pickers on platforms.

Still another object is to provide a conveyor system for use on a harvester which is capable of conveying tender skinned comestibles without damage.

A further object is to provide a harvester which can be utilized to harvest a field several times during the growing season.

A still further object is to provide a mechanical harvesting aid that decreases the overall cost of harvesting the crop.

Another object is to provide a mechanical harvesting aid that will enable a grower to increase the percentage yield of a field.

Another object is to provide a mechanical harvester which is inexpensive enough to be bought by smaller volume growers.

Another object is to provide a harvester which is adjustable to harvest fields in which the distance between rows of crop varies.

Another object is to provide a harvester upon which a worker may grade and pack the crop.

Another object is to provide a harvester conveyor which provides a flexible pocket to receive the picked crop.

Another object is to provide a harvester conveyor which automatically, gently, lowers its contents onto another conveyor whereby a minimum of bruising takes place.

Another object is to provide a harvester by which the fruit can be picked without damage to the fruit and growing vine.

Other objects of the invention will in part be obvious and will in part appear hereinafter.

The above and other objects not specifically enumerated above are efficiently obtained by providing a wheeled platform capable of spanning several rows of growing plants with a plurality of conveyors. In addition, low platforms are provided from which workers may pick ripe fruit and place it on the conveyor as the platform moves down the rows.

The conveyors utilized are of the endless type comprising two chains held in spaced relation by a plurality of ladder walls in parallel relation about the endless belt. A flexible apron is attached near the bottom of each ladder wall and extends from chain to chain. This apron is sufficiently long, accounting for inherent sag, to extend over the top of the adjacent ladder wall. As the conveyor turns, picked fruit and vegetables are placed between these ladder walls. The apron sags under this weight and provides a cushion for the picked fruit. As the fruit nears the top of the conveyor, the bottom supporting wall ends and the weight of the entrained fruit causes the apron to gently lower the fruit onto a platform from which they are graded and boxed or further conveyed away. As the conveyor recycles, the aprons are repositioned on the adjacent wall in preparation for receiving new fruit.

The invention accordingly comprises the features of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 3 is a cross sectional view of one part of the conveyor system through line 3—3.

FIG. 4 is a cross sectional view of one part of the conveyor system through line 4—4.

FIG. 5 is a view through line 5—5 of FIG. 4.

FIG. 6 is a partial side view of the top of the conveyor.

Similar reference characters refer to similar parts throughout the several views of the drawings.

Figure 1:
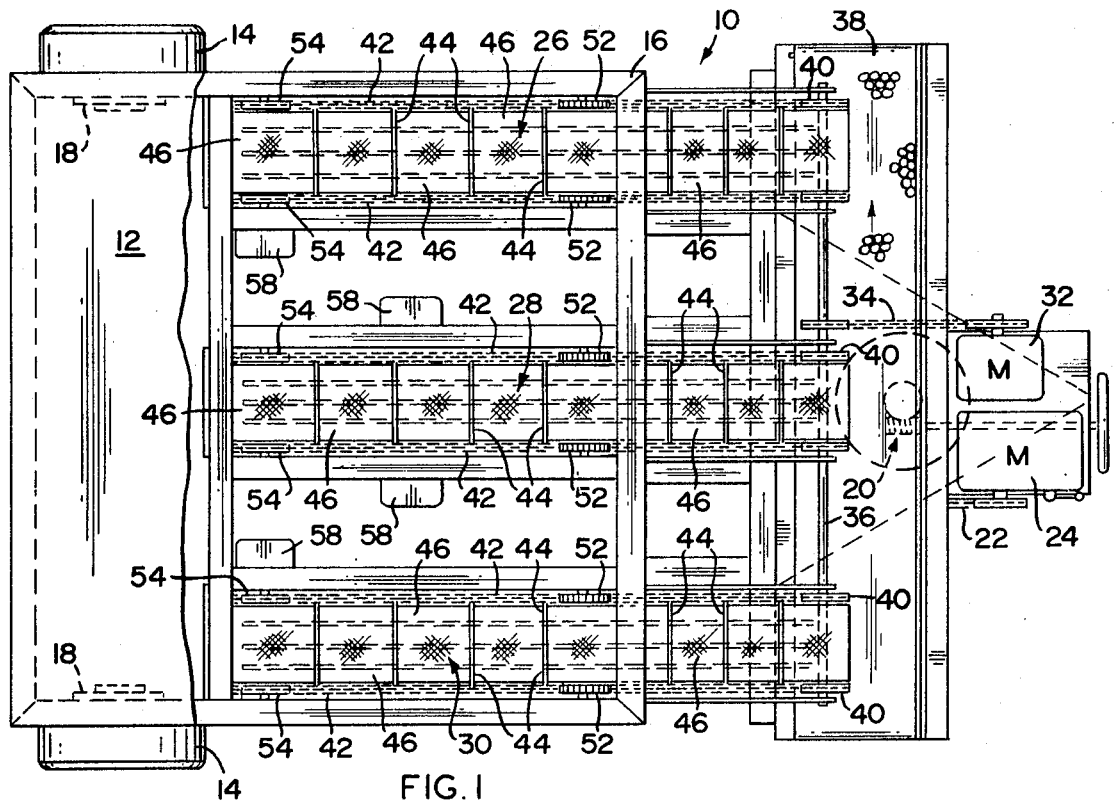
FIG. 1 is a top view of the harvester.

FIG. 1 is a top view of the tomato harvester 10 of the present invention. This harvester has a tricycle design which is made of channel iron, all welded construction. The machine is approximately 10 feet wide and 16 feet long. On the top, a crate platform 12 is provided to provide working space and to carry empty tomato crates. Harvester 10 is supported by wheels 14. Wheels 14 are designed to operate in the rows between the tomato vines. The harvester platform 16 is raised above the height of the tomato vines by the wheel supports 18 so that the harvester may pass over the tomato vines without damaging them. The leading wheel 14 is the drive wheel and is steered by any standard steering mechanism 20, shown in dotted lines. Wheel 14 is here shown to be driven by an engine 24 and an endless chain 22, however, it is contemplated that any well known motive means could be utilized.

Located on platform 16 in addition to drive motor 24 is a second motor 32 which, by endless chain 34, drives axle 36. Axle 36 is operatively connected to conveyors 26, 28 and 30. The operation of these conveyors will be discussed below. A delivery means in the form of either endless belt conveyor 38 or just a flat surface is attached to platform 16 in order to receive the tomatoes from conveyors 26, 28 and 30. If a platform is used, the packers would box the tomatoes at that point. If a conveyor is used, the tomatoes are moved to an adjacent location (not shown) where they will be boxed. Endless belt conveyor 38 is of standard construction and is adapted to be driven from motor 32.

Affixed to platform 16 are three endless conveyors 26, 28 and 30. They are identical in construction and operation, therefore, while only conveyor 30 will be discussed in detail, it should be noted that the discussion pertains to conveyors 26 and 28 also.

Conveyor 30 comprises a pair of bands, which may be chains, endless belts and the like, in parallel, fixed relation. Bands 42 are separated by a plurality of ladder walls 44 which provide the function of keeping bands 42 parallel and providing a support for apron 46. Ladder walls 44 are attached to bands 42 by bolts 48, as may be seen in FIGS. 3 and 4. In addition, the conveyor 30 may be provided with sidewalls of elastic, flexible material 45 which protects the tomatoes and is attached to the sides and connect ladders 44. Apron 46 is a generally rectangular piece of flexible material, such as canvas, plastic, rubber or the like. The apron is bolted or otherwise fastened to the bottom portion of ladder walls 44, as may be seen in FIGS. 4 and 5. The apron extends over the adjacent ladder wall, as shown in FIG. 6.

Figure 2:
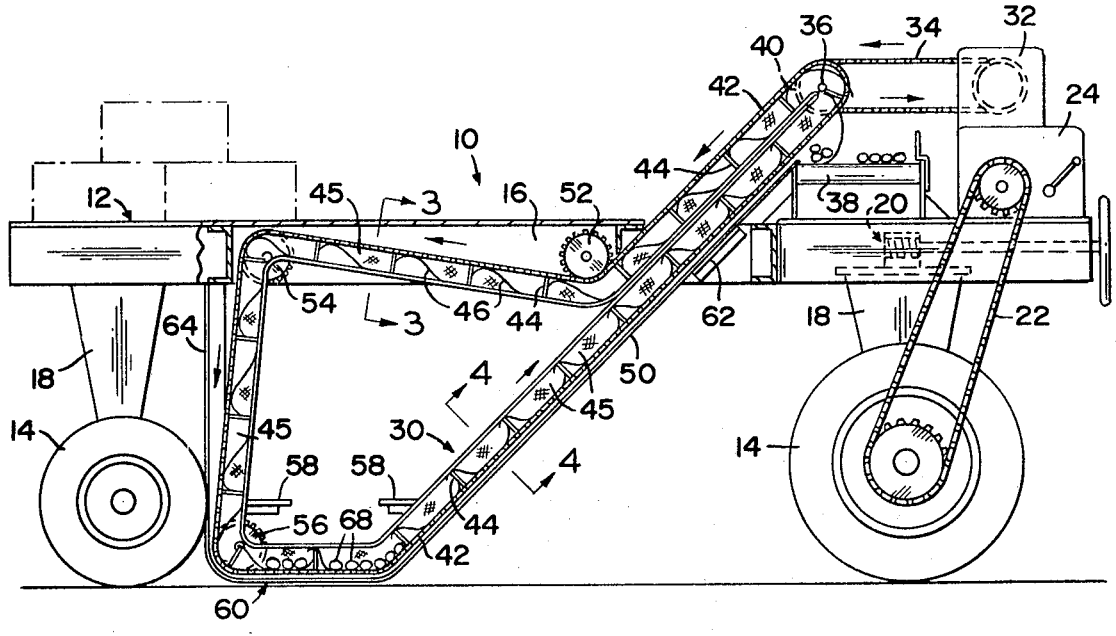
FIG. 2 is a side view of the harvester of FIG. 1.

The conveyor 30 is tensioned between power wheel 40 and idler pinion wheels 52, 54 and 56. The conveyor wheels, both motive and idler, are conventionally rotatably mounted on frame 16 by bolts (not shown) or other similar fastening devices. Located at the base of conveyor 30 is a support chute 50, seen in FIG. 2, which is used to keep apron 46 from falling between ladder walls 44 during the fruit conveying stage. Chute 50 is made of metal or similar material and is welded to frame 16 at 62. The foot 60 of chute 50 is fixedly attached to frame 16 by metal bar 64 by bolting or welding.

Referring now to FIG. 1, conveyors 26, 28 and 30 are supported laterally by support bars 66 which are attached to foot 60 of chute 50. Seats 58 are attached to these supports in order to afford a place for the pickers to sit while they are harvesting the crop.

In operation, the harvester 10 is driven between the rows of the tomato crop and the picker, sitting on seat 58, can easily choose and pick the ripe tomatoes 68 without damaging the plant.

As ladders 44 and aprons 46 pass by the pickers, picked tomatoes 68 are placed in the soft pouch 70 formed by apron 46, as seen in FIG. 5. The fruit is then gently carried up the incline. As the tomatoes reach the top of the conveyor, chute 50 ends and since apron 46 no longer has a support backing, the weight of tomatoes 68 forces the apron in a counterclockwise motion as shown in FIG. 6. This movement is aided by the fact that the tip 72 of ladder 44 begins to accelerate relative to the base as it makes the turn at the top of the conveyor 30. This causes apron 46 to be pulled outwardly and away from its adjacent ladder. The result of this apron action is that the tomatoes are gently placed on the transversely moving endless belt 38. The aprons are then carried around the conveyor, as illustrated, and made ready to receive another load of ripe fruit.

Hence, the unique harvester provides an efficient and economical method to harvest and convey ripe, easily damaged fruits and vegetables without damage to the plant itself.

It is also within the contemplation of this invention that more or less conveyor belts be utilized on the platform. It is also contemplated that the conveyors and seats be adjustable both in the horizontal and vertical directions in order to allow for difficult types of terrain and crops.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described:

What is claimed is:

1. A harvesting machine including in combination: a wheel mounted frame adapted to move above and between growing plants without damaging said plants, endless conveyor means adapted to raise picked fruit from said plants to a delivery means on said frame, motive means operatively connected to said endless belt conveyor means whereby said conveyor is caused to move, a plurality of planar, rigid ladders fixedly attached to said conveyor means in spaced relation to one another, said endless conveyor means further comprising a flexible apron attached to each of said ladders, each of said aprons being of sufficient dimension to extend over the subsequent adjacent ladder thereby forming a pouch between said ladders, whereby fragile, picked fruit may be conveyed in said pouch and said apron, in response to the weight of said fruit and in conjunction with the movement of the top of said ladder, will be pulled from the top of said adjacent ladder thereby gently lowering the fruit through the bottom of said conveyor onto said delivery means.

2. The harvesting machine of claim 1 wherein said apron is a flexible material and further wherein at least part of said conveyor has a support chute located under said conveyor whereby said apron is prevented from falling off said adjacent ladder when fruit is placed within said pouch, and further wherein said ladders extend substantially perpendicular to the plane of said bands.

3. The harvesting machine of claim 2 wherein said chute terminates at the delivery means and said conveyor means further comprises two endless bands held in a fixed, parallel spaced relation to one another by said ladders.

4. The harvesting machine of claim 3 wherein said conveyor means has at least three idler wheels in addition to a power drive wheel.

5. The harvesting machine of claim 1 wherein said machine has at least three conveyors.

6. The harvesting machine of claim 5 wherein said conveyors have adjustment means whereby said conveyors may be moved in the horizontal and the vertical directions.

7. The harvesting machine of claim 1 wherein said machine has seat means whereby a picker may ride on said harvester while picking fruit.

8. The harvesting machine of claim 1 wherein each of said flexible aprons is attached to the bottom of each of said ladders.

9. The harvesting machine of claim 1 wherein a flexible sidewall is provided, connecting the sides of said ladders, thereby protecting said fruit from damage.

10. The harvesting machine of claim 1 wherein said delivery means is a second conveyor.

* * * * *